United States Patent [19]

Roy et al.

[11] Patent Number: 5,139,895
[45] Date of Patent: Aug. 18, 1992

[54] HYDROGEN THERMAL ELECTROCHEMICAL CONVERTER

[75] Inventors: Prodyot Roy, Saratoga; Douglas N. Rodgers; Samir A. Salamah, both of San Jose, all of Calif.

[73] Assignee: General Electric Company, San Jose, Calif.

[21] Appl. No.: 732,964

[22] Filed: Jul. 19, 1991

[51] Int. Cl.⁵ .................................................. H01M 8/06
[52] U.S. Cl. ...................................... 429/17; 429/20; 429/102
[58] Field of Search ................ 429/17, 19, 20, 101, 429/102, 104, 26

[56] References Cited

U.S. PATENT DOCUMENTS

| | | | |
|---|---|---|---|
| 3,014,084 | 12/1961 | Ciarlariello | 136/86 |
| 3,031,518 | 4/1962 | Werner et al. | 136/86 |
| 3,119,723 | 1/1964 | Crouthamel et al. | 136/86 |
| 3,192,070 | 6/1965 | Tragert et al. | 136/86 |
| 3,245,836 | 4/1966 | Agruss | 136/83 |
| 3,338,749 | 8/1967 | Johnson et al. | 136/86 |
| 3,357,860 | 12/1967 | Stachurski | 136/86 |
| 3,368,921 | 2/1968 | McKenzie et al. | 136/86 |
| 3,445,292 | 5/1969 | Childs | 136/86 |
| 3,458,356 | 7/1969 | Kummer et al. | 136/83 |
| 3,511,715 | 5/1970 | Angus | 136/86 |
| 3,817,791 | 6/1974 | Greatbatch et al. | 136/83 |
| 4,049,877 | 9/1977 | Saillant et al. | 429/11 |
| 4,443,522 | 4/1984 | Struthers | 429/18 |
| 4,692,390 | 9/1987 | Roy | 429/17 |
| 4,791,390 | 12/1988 | Harris et al. | 333/166 |
| 4,818,638 | 4/1989 | Roy | 429/20 |

OTHER PUBLICATIONS

"Zersetzungsdrücke in Lithium/Natrium/Wasserstoff-Systemen," by Weirich et al., published in Zeitschrift für Physikalische Chemie Neue Folge, Bd. 158, S. 69-79 (1988).

*Primary Examiner*—Anthony Skapars

[57] ABSTRACT

A system for converting heat energy into electricity includes a conversion cell comprising a pair of spaced-apart electrodes having an electrolyte therebetween. The electrolyte is selected to pass negatively-charged hydrogen ions and to inhibit the passage of atomic hydrogen and positive hydrogen ions. Inducing a flow of hydrogen through the cell, a current may be generated between the electrodes as electrons are gained by the hydrogen as it enters the cell and lost by the hydrogen as it leaves the cell. In the preferred embodiment, hydrogen flow is induced by reacting the hydrogen leaving the cell with a mixture of lithium and sodium to form the metal hydride. The metal hydride is then thermally decomposed to release the hydrogen and the molten metal to be recycled to the cell. In this way, the thermal energy used to decompose the metal hydride is converted into electrical energy by passing the hydrogen through the conversion cell.

21 Claims, 3 Drawing Sheets

HYDROGEN THERMAL ELECTROCHEMICAL CONVERTER

BACKGROUND OF THE INVENTION

1. Field of Invention

The present invention relates generally to the conversion of heat energy into electrical energy utilizing a hydrogen thermal electrochemical converter, and more particularly, to methods and systems for such conversion involving a reactant which operates over a wider range of temperatures than heretofore.

2. Description of the Prior Art

Methods and systems for; converting heat energy to electrical energy utilizing hydrogen and a liquid metal reactant such as liquid sodium or liquid lithium are known. U.S. Pat. No. 4,692,390, issued Sep. 8, 1987 to Prodyot Roy, one of the instant inventors, discloses and claims such a method, and U.S. Pat. No. 4,878,638, issued Apr. 4, 1989, a division of U.S. Pat. No. 4,692,390, also issued to Prodyot Roy, discloses a claims such a system. These patents are incorporated herein by reference.

With reference to FIG. 1 of either patent, repeated herein, with minor changes, as FIG. 1, hydrogen under pressure released in decomposition vessel 26 from a metal hydride is passed through conduit 34 to vessel 20 which includes an upper plenum 38, a lower chamber 32 (unnumbered in FIG. 1 of the aforementioned patents) and a conversion cell 12. The cell 12 includes first cathode electrode 14 and second anode electrode 16 which, along with walls of vessel 20, define a (unnumbered) chamber for holding electrolyte 18.

The electrodes are composed of solid metal which is chemically inert with hydrogen and which allows relatively fast hydrogen permeation. The hydrogen above cathode electrode 14 is in molecular form ($H_2$) but changes to the single atom form as it passes through the cathode electrode. Electrons at cathode electrode 14 combine with the single atoms (nonionized) hydrogen (H) to form negative hydrogen ions ($H^-$) which pass through the molten electrolyte to the anode electrode 16. The hydrogen loses electrons at the electrode 16-electrolyte 18 interface and passes through the anode electrode where the hydrogen combines with the liquid metal 42. The electrons released at the anode electrode 16 pass through the load circuit 40 to the cathode electrode 14. In this way, it will be appreciated that electrical current capable of producing useful work is generated. The lower chamber 32 of vessel 20 contains a liquid metal 42 such as liquid lithium (Li) or liquid sodium (Na) which combines with the hydrogen to form lithium hydride (LiH) or sodium hydride (NaH).

The resultant lithium hydride or sodium hydride passes through conduit 30 to decomposition chamber 26 where heat, indicated as Q, is utilized to decompose the metal hydride into (1) hydrogen under pressure which flows back through conduit 34 to the upper part of chamber 20 and into (2) liquid metal absent the hydrogen driven back through conduit 36 to lower part of chamber 20. Although not shown in FIG. 1, a temperature reduction means is typically positioned in conduit 36 to lower the temperature of the molten metal from the relatively high temperature achieved in decomposition chamber 26. An exemplary though not limiting source of heat Q is provided by a nuclear reactor. Other acceptable sources are solar concentrator, fossil power plant and radio-isotope.

In the prior art systems, as represented by the two aforementioned patents, lithium or sodium is chosen depending on the temperature Q in decomposition chamber 26. Thus, lithium works best at a temperature range of 1,200°–1,500° Kelvin (K.) in decomposition chamber 26 while sodium works best at a range of 700°–850° K.

It is now recognized that operation of cell 12 requires a certain minimum pressure in upper chamber 38. For most efficient operation of the cell, the hydrogen pressure should be about ten atmospheres or more, although operation at lower pressures, such as, for example, five atmospheres, is acceptable. Further, a hydrogen pressure differential on the order of 100:1 or 200:1 is required between upper plenum 38 and lower chamber 32. However, to achieve such pressure and pressure differential for the lithium/lithium hydride combination, the temperature in decomposition chamber 26 must be greater than 1,350° K.

When sodium is used, the temperature in the decomposition chamber must not exceed 850° K. Otherwise, the hydrogen pressure in plenum 38 becomes excessively high for practical purposes. Yet the fuel cell 12 must operate between 700° K. and 850° K. in order to attain sufficient hydrogen flow through the cell electrodes and therefore sufficient power from the cell. The hydrogen pressure in the lower chamber 32 is determined by the sodium (or lithium temperature) in lower chamber 32.

If the fuel cell temperature falls too low, undesirable precipitation of solid hydride occurs. For the sodium/sodium hydride cycle, the narrow range between the operating temperature of cell 12 (700°–850° K.) and the decomposition temperature (850° K. max) results in a very small pressure difference between plenum 38 and chamber 32 to drive the cell. Consequently, in order to create a practical pressure difference across the cell it is necessary to heat the sodium/sodium hydride mixture in decomposition chamber 26 above 850° K. and then to remove hydrogen from the sodium/sodium hydride mixture by precipitating sodium hydride from the stream at approximately 400° K. Precipitation is done outside the fuel cell assembly in a cold trap (not shown). The equipment required for this sodium processing, heat exchanger and cold trap, as well as the inventory of solid sodium hydride in the cold trap represents a severe penalty in system mass and size.

As above mentioned, to achieve the ten atmospheres hydrogen pressure, or higher, required for efficient operation of cell 12, the decomposition chamber for the lithium/lithium hydride cycle must be operated at temperatures above 1,350° K. in order to attain the required high pressure of hydrogen. To reach a temperature of 1,350° K, however, will require a nuclear reactor or other heat source (such as solar with a concentrator) to operate at, for example, 1,400° K. In turn, this will require a lithium cooled refractory metal reactor (or solar concentrator system) which is only practical in the vacuum of space. For terrestrial (or martian) application the reactor components must be protected from oxidation by placing the reactor and heat transfer system in an elaborate inert gas or vacuum chamber. Furthermore, even for space (vacuum) application it will be desirable to reduce the reactor outlet temperature which will significantly reduce the mass and the complexity of the system. Furthermore and unfortunately, lithium hydride has a melting point of approximately 950° K. Below that temperature, solid lithium hydride undesirably precipitates which makes it difficult in the system of FIG. 1 of the prior art patents to pump the lithium hydride mixture through conduit 30 to thermal decomposition vessel 26.

An article by Von W. Weirich et al. entitled "Zersetzungsdrücke in Lithium/Natrium/ Wasserstoff-Systemen" published in Zeitschrift für Physikalische Chemie Neue Folge, Bd. 158, S. 69-79, (1988), describes the use of a system for decomposing water by electrolysis to obtain hydrogen at high pressures for distribution. To do so, Weirich et al. propose to use a mixture of lithium and sodium. The temperatures studied in the Weirich et al. paper varied between 923° K. and 1,173° K. (650° C. and 900°C.). As best understood by the present inventors, Weirich et al. are proposing a method of producing pure hydrogen gas by electrolysis of water and distributing hydrogen fuel at high pressures.

SUMMARY OF THE INVENTION

In accordance with a preferred embodiment of the present invention, an electrochemical conversion cell comprises a pair of spaced-apart solid electrodes having an electrolyte therebetween chosen to selectively pass hydride ions ($H^-$), means for supplying hydrogen gas to a first of said electrodes, means for supplying a mixture of lithium and sodium to a second of said electrodes which reacts with the hydrogen gas so that a chemical potential is created across the electrodes, whereby the flow of hydrogen across the electrodes induces a current flow between the electrodes.

DETAILED DESCRIPTION OF THE PREFERRED EMBODIMENT

Figure 1:
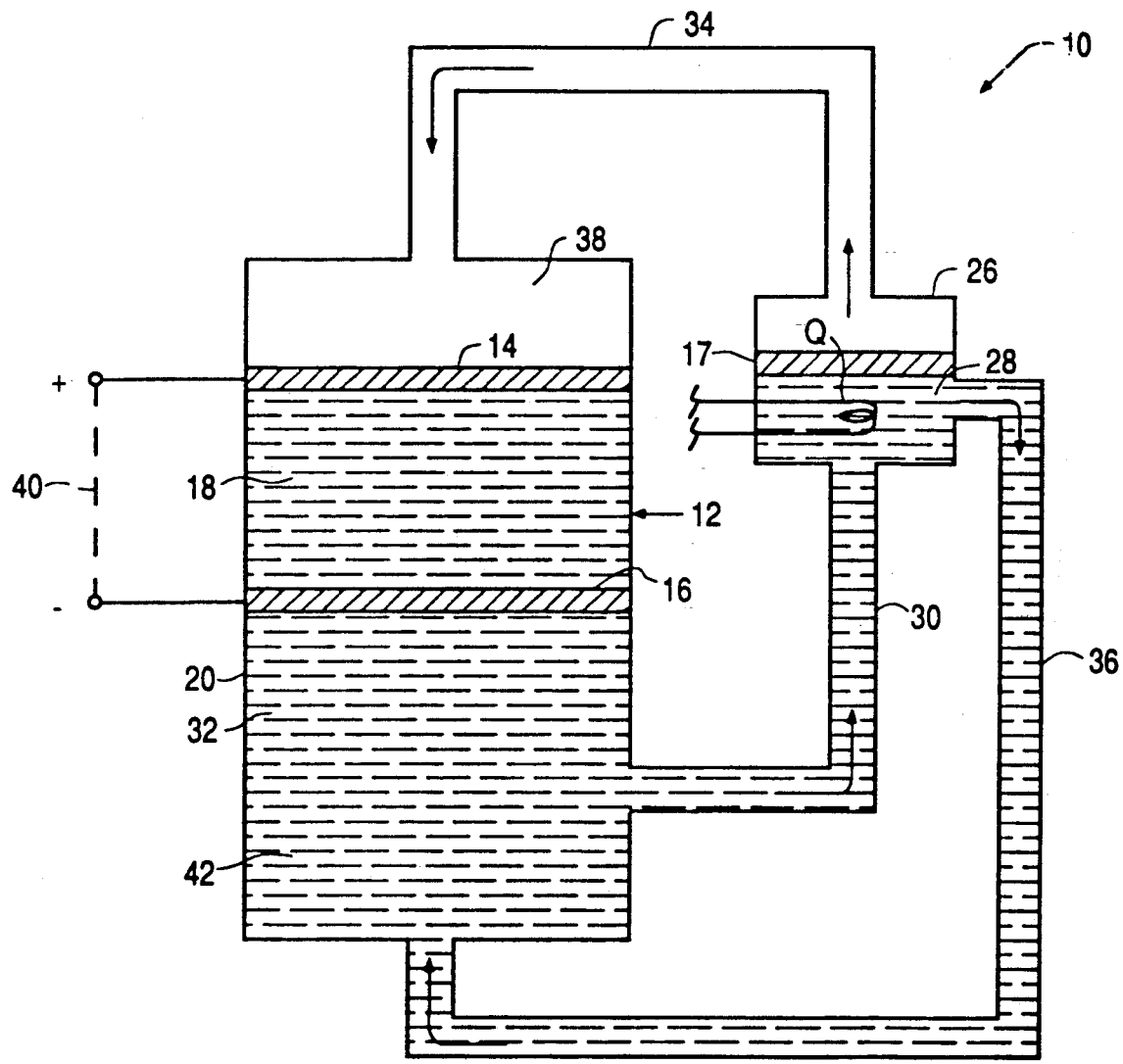
FIG. 1 is a system for converting heat energy from a source Q into electricity.

FIG. 1 is exactly as shown in FIG. 1 of the aforementioned U.S. Pat. Nos. 4,692,390 and 4,818,638 incorporated by reference herein, except for the addition of legend 32 representing the lower chamber as described in the aforementioned patents. The only structural difference between the prior art and the present invention is the substitution in chamber 32 of a molten metal combination of lithium and sodium in place of the liquid lithium OR sodium 42 described and claimed in the previous patents. Furthermore as described in the previous patents, the amount of pressure required in upper plenum 38 for operation of the fuel cell was not fully realized. It is now realized that the pressure must be a minimum of about ten atmospheres for most efficient operation. Yet, there is a practical upper limit as to the hydrogen pressure in chamber 38 due to structural constraints in the system. A reasonable upper limit is on the order of 20 or 30 atmospheres. Also, as previously mentioned in connection with the instant invention, it has been found that the fuel cell 12 should operate between about 700° K. and 850° K.

It is also now realized that operation of the cell is enhanced by the addition of a solid hydrogen-permeable membrane 17 in decomposition chamber 26 for the purpose of separating hydrogen gas from the liquid metal. It is now realized that electrodes 14 and 16 and permeable membrane 17 are typically of identical material and constructed of nickel, palladium, vanadium, zirconium, and niobium, and the like, as mentioned in the patents incorporated by reference as well as beta-titanium which is now believed to be the preferred material due to its high hydrogen permeability. As mentioned in the patents incorporated by reference, the electrodes and newly disclosed membrane 17 are to be as thin as practical to allow permeation of single atom hydrogen. A thickness of 0.1 millimeters is now feasible.

Figure 2:
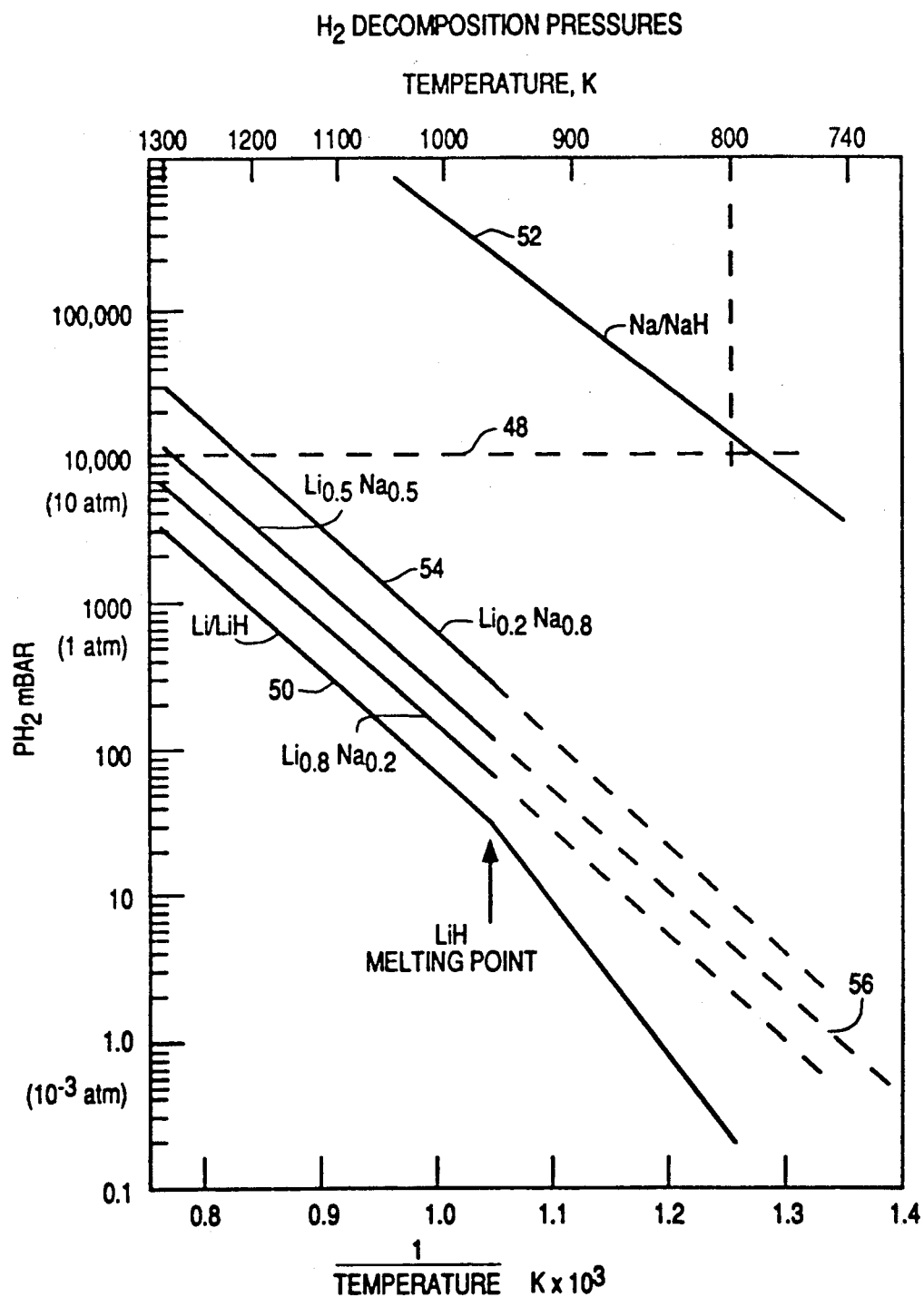
FIG. 2 is a graph illustrating atmospheres of hydrogen decomposition pressure in millibars and atmospheres at various decomposition temperatures and various mixtures of lithium and sodium.

Referring now to FIG. 2, there is shown a number of mixtures of lithium and sodium and pure lithium and pure sodium. The vertical axis is illustrated in millibars and atmospheres one bar being about 0.99 atmosphere. For all practical purposes they are the same. The ten atmosphere line is indicated as a dashed line 48. The upper horizontal axis is in degrees kelvin which, it will be noted, is nonlinear. The lower horizontal axis is 1/temperature which is linear. Thus, with reference to line 50, which illustrates a plot of hydrogen decomposition pressures on the vertical axis versus temperature in K. on the horizontal axis, it will be noted that even at 1,300° K. the pure lithium does not reach ten atmospheres of hydrogen decomposition pressure. Also, it will be noted that at approximately 950° K. lithium hydride precipitates so that the lithium becomes a solid. Thus, this sets the lower temperature at which lithium only can operate.

Conversely and with reference to line 52, the sodium and sodium hydride mixture is at ten atmospheres at less than 800° K. and rapidly rises above that pressure. In that connection, it should be understood that the decomposition pressure scale, that is the vertical scale, is logarithmic. In contrast to pure lithium represented by line 50 at one extreme and pure sodium represented by line 52 at the opposite extreme, the mixtures of lithium and sodium are substantially more desirable at the desired pressure of ten to twenty or thirty atmospheres. As further noted from FIG. 2, the various lithium and sodium mixtures provide ten atmospheres of hydrogen decomposition pressure at various temperatures. Thus, in accordance with line 54 which illustrates a lithium mole fraction of 0.2 and sodium mole fraction of 0.8 the ten atmospheres decomposition pressure is reached at a temperature of approximately 1,200° K. With higher fractions of lithium and therefore lower fractions of sodium, the decomposition temperature required to achieve those pressures increases.

Figure 3:
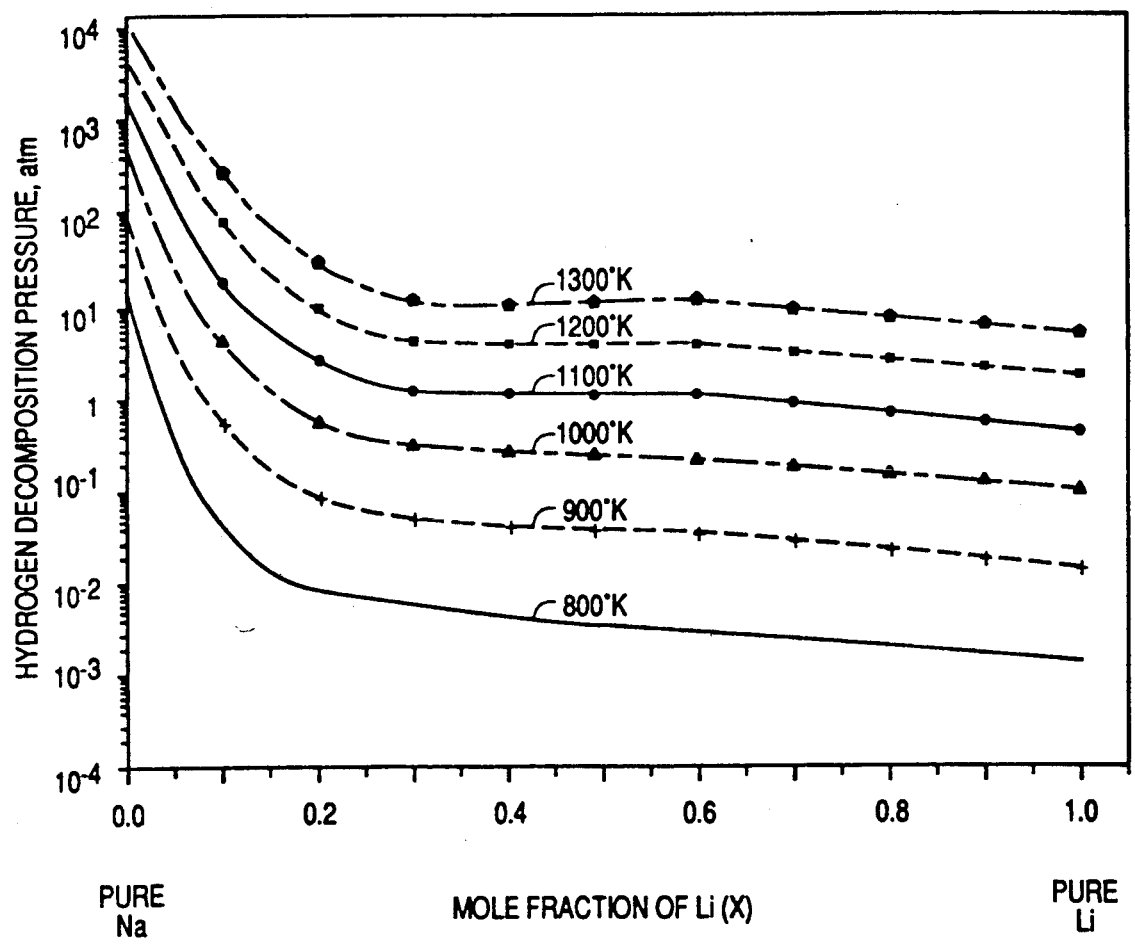
FIG. 3 is also a graph of hydrogen decomposition pressures against different percentages of lithium and sodium for various decomposition temperatures.

FIG. 3 contains the same data as in FIG. 2 but presented differently. Thus, in FIG. 6 pressure in atmospheres is on the vertical axis while mole fractions are on the horizontal axis with various temperature lines being shown. Thus, with a given pressure and temperature specified the mole fraction of Li can be easily determined. It is interesting to note that the temperatures are essentially linear above 0.2 Li mole fractions and very nonlinear at Li mole fractions below 0.2.

Thus, given the temperature available from heat source Q (FIG. 1), the acceptable mixture of Li and Na can be selected from FIG. 2 or FIG. 3 to provide the desired ten atmospheres minimum hydrogen pressure in plenum 38 and to provide the 100:1 or 200:1 pressure difference between plenum 38 and lower chamber 32.

Line 50 (Li/LiH) in FIG. 2 shows a change in slope at the melting point of LiH (approximately 950° K.), which indicates precipitation of solid LiH phase. As discussed previously, this is not desirable from the standpoint of pumping a mixture of solid LiH and liquid Li. From theoretical analysis it can be predicted that addition of Na to Li will lower the solid LiH precipitation temperature. The data of Weirich et al. was taken above the melting point of LiH (950° K.) as indicated by solid lines in FIG. 2. Experiments conducted at temperatures much below the lithium melting point with 50 mole percent mixture of Li and Na as indicated at 56 show that the high temperature data of Weirich et al. extrapolates linearly (i.e., no change in slope) to temperatures as low as 673° K. indicating no precipitation of solid LiH. Therefore it appears that the problem of precipitation of pure Lithium does not occur with any Li/Na mixture.

Operation of the system will not be given herein since it was described in the aforementioned U.S. patent incorporated by reference herein.

What is claimed is:

1. An electrochemical conversion cell comprising:
   a pair of spaced-apart solid electrodes having an electrolyte therebetween chosen to selectively pass hydride ions ($H^-$);
   means for supplying hydrogen gas to a first of said electrodes;
   means for supplying a mixture of lithium and sodium to a second of said electrodes which reacts with the hydrogen gas so that a chemical potential is created across the electrodes,
   whereby the flow of hydrogen across the electrodes induces a current flow between the electrodes.

2. A cell as in claim 1, wherein the electrodes are composed of a solid metal selected from the group consistent of nickel, palladium, vanadium, zirconium, niobium and beta-titanium.

3. A cell as in claim 1, wherein the electrolyte is selected from the group consisting of mixtures of lithium hydride, lithium chloride, calcium hydride, calcium chloride and potassium chloride.

4. A cell as in claim 1, wherein said mixture of lithium and sodium is in a molten state and reacts with hydrogen to form a metal hydride.

5. A cell as in claim 4, wherein the means for supplying hydrogen gas comprises a means for thermally decomposing the metal hydride formed by reaction of hydrogen and the molten metal.

6. The combination of claim 5 wherein the means for thermally decomposing includes a hydrogen-permeable membrane and causes said hydrogen gas to be at about ten atmospheres pressure and separated from said liquid metal by said membrane and supplied to said first electrode at said first of said electrodes.

7. A electrochemical conversion system comprising:
   a cell including a pair of spaced-apart solid electrodes having an electrolyte therebetween chosen to selectively pass ionized hydrogen atoms;
   an external circuit connecting the electrodes;
   means for thermally decomposing and separating a metal hydride into hydrogen gas and molten metal mixture of lithium and sodium;
   means for directing the hydrogen gas to a first of said electrodes;
   means for cooling the molten metal mixture; and
   means for directing the cooled molten metal mixture to a second of said electrodes so that the metal mixture reacts with hydrogen which has passed through the cell to reform the metal hydride, whereby hydrogen passing through the cell causes an electric current to pass through an external circuit connecting the electrodes.

8. A system as in claim 7, wherein the electrodes are composed of a metal selected from the group consistent of nickel, palladium, vanadium, zirconium, niobium and beta-titanium.

9. The combination of claim 7 wherein the means for thermally decomposing causes said hydrogen gas to be about ten atmospheres pressure at said first of said electrodes.

10. A system as in claim 7, wherein the electrolyte selectively passes negatively charged hydrogen ions.

11. A system as in claim 10, wherein the electrolyte is selected from the group consisting of mixtures of lithium hydride, lithium chloride, calcium hydride, calcium chloride and potassium chloride.

12. A system as in claim 7, wherein the means for thermally decomposing includes a vessel heated by a nuclear reactor.

13. A system as in claim 7, further comprising means for recycling the reformed metal hydride to the means for thermally decomposing.

14. A method for producing electricity, said method, comprising:
    flowing hydrogen through an electric conversion cell comprising a pair of spaced apart solid metal electrodes which are permeable to hydrogen and which have an electrolyte therebetween, chosen to selectively pass hydride ions ($H^-$), said hydrogen being reduced to $H^-$ a first of said electrodes and oxidized to H at a second of said electrodes, said hydrogen flow being induced by a chemical potential gradient formed across the cell resulting from reaction of hydrogen with a liquid metal mixture of lithium and sodium to form a metal hydride,
    whereby an electric current is induced through an external circuit connecting the electrodes.

15. The method of claim 14 comprising the further step of heating the hydrogen-liquid metal mixture to produce a hydrogen pressure at said first of said electrodes at about ten atmospheres.

16. A method for producing electricity, said method comprising:
    thermally decomposing and separating a metal hydride at a first temperature to produce hydrogen gas and a molten metal mixture of lithium and sodium;
    directing the hydrogen gas to a first electrode of a cell including a pair of spaced-apart solid electrodes having an electrolyte therebetween chosen to selectively pass ionized hydrogen atoms;
    cooling said molten metal mixture to a second temperature; and
    directing the cooled molten metal mixture to a location adjacent the second electrode so that the metal reacts with hydrogen which has passed through the cell to reform the metal hydride, whereby hydrogen passing through the cell causes an electric current to pass through an external circuit connecting the electrodes.

17. A method as in claim 16, wherein the electrolyte selectively passes $H^-$ and the hydrogen is reduced to $H^-$ at the first electrode and oxidized to H at the second electrode.

18. A method as in claim 16, wherein the electrolyte is selected from the group consisting of mixtures of lithium hydride, lithium chloride, calcium hydride, calcium chloride and potassium chloride.

19. A method as in claim 16, wherein the electrodes are composed of a metal selected from the group consisting of nickel, palladium, vanadium, zirconium, niobium and beta-titanium.

20. A method as in claim 16, wherein the metal hydride is decomposed and separated by exposure to heat obtained from a nuclear reactor.

21. The method of claim 16 comprising the further step of heating the hydrogen-liquid metal mixture to produce a hydrogen pressure at said first of said electrodes at about ten atmospheres.

* * * * *

UNITED STATES PATENT AND TRADEMARK OFFICE
CERTIFICATE OF CORRECTION

PATENT NO. : 5,139,895
DATED : August 18, 1992
INVENTOR(S) : Prodyot , Roy et al It is certified that error appears in the above-indentified patent and that said Letters Patent is hereby corrected as shown below:

Column 1, line 15, delete ";".

Column 1, line 20, "4,878,638 should be --4,818,638--.

Column 6, line 12, before "about" insert --at--.

Column 6, line 34, before "a" insert --at--.

Signed and Sealed this

Fourteenth Day of September, 1993

Attest:

BRUCE LEHMAN

Attesting Officer

Commissioner of Patents and Trademarks